(No Model.)
C. S. SIMMERS.
COLD SAW FOR METALS.
No. 473,480. Patented Apr. 26, 1892.
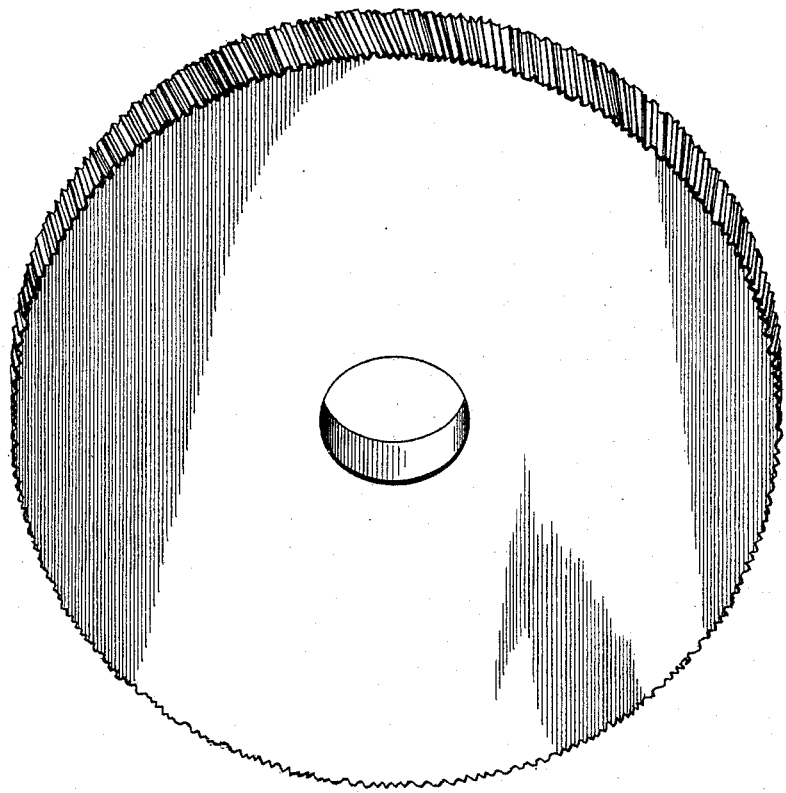

UNITED STATES PATENT OFFICE.

CHARLES S. SIMMERS, OF SCHUYLKILL, PENNSYLVANIA.

COLD-SAW FOR METAL.

SPECIFICATION forming part of Letters Patent No. 473,480, dated April 26, 1892.

Application filed December 21, 1891. Serial No. 415,778. (No model.)

*To all whom it may concern:*

Be it known that I, CHARLES S. SIMMERS, a citizen of the United States, residing at Schuylkill, in the county of Chester and State of Pennsylvania, have invented certain new and useful Improvements in Cold-Saws for Metal; and I do hereby declare the following to be a full, clear, and exact description of the invention, such as will enable others skilled in the art to which it appertains to make and use the same.

My invention relates to cold-saws for cutting metal.

Cold-sawing is usually done by a disk of steel having a smooth periphery, said disk running at a high velocity, thus causing great friction, whereby the metal is cut. After successive cuts the saw gradually becomes highly heated and scale (the burned sawings) collects on the periphery of the saw, which causes the "ring of fire" frequently seen around such saws. This great heat around the periphery of the disk or saw causes an unequal expansion, resulting in cracks from the periphery toward the center of the saw, also dishes the same and cracks the saw around the clamping-washer on the shaft. The plain disk or saw when "cutting heavy" gradually thickens at the edges and the corner wears off, thus making the center of the saw its greatest diameter, and the surface of contact becomes too great for the belt to drive. The saw then stops in the kerf if too hard pressed, which occurs very frequently, thus making it very difficult to get the saw out of the work without cracking or buckling it. In using a saw of this character it is occasionally run slowly and traverses an emery-wheel along its sides for the purpose of grinding it to about its usual thickness; but this method has failed to overcome the great objection of the greatest bearing-surface being in the center, which requires more power to operate it than a square-edge saw. By using the saw with a smooth periphery it becomes necessary to "turn" the saw-shaft, as a flat place is worn in the shaft, inasmuch as the plain or smooth cold-saw wears unequally, and to make it fit for use again it is necessary to true it in a lathe.

The object of my invention is to obviate all the objections.

In the drawing the figure shown is a view illustrating my invention.

The saw is provided with irregular indentation or "hacks," as contradistinguished from saw-teeth, said indentations acting somewhat on the principle of a file. A disk thus hacked frees itself from the "scales," and the saw comes into actual contact with the work, cutting as a file. By simply hacking the disk in this manner its life is prolonged from ten to twelve times longer than the disk with a smooth periphery, and this has been demonstrated by actual working.

The burr on the beams cut with my improved cold-saw is less than one-quarter of that left by a saw with the smooth periphery and is easily cut off. Further, the ends cut are smooth and square and have a finished appearance. The periphery of the saw being hacked increases its width of cut from one-sixteenth to one-eighth and keeps it square on the edges, thus allowing it to "cut easy," gives clearance to the body of the saw, lessens friction, prevents dishing, and lessens tendency to crack. Thus it is obvious that the cutting capacity is increased and that by said hacking the saw can be kept circumferentially true, and the teeth thus formed free themselves from the cuttings, allowing a quicker feed and heavier cuts than is possible with a disk with a smooth periphery, which "rubs" and melts the cut.

It does not become necessary to shut down to turn up the saw-shaft when the saw illustrated is used.

I am enabled by this construction to cut light beams to angles and exact lengths. This cannot be done with the plain disk, as it requires three-fourths to five-eighths of an inch beyond the length cut to steady the saw, the "rotary" cutters usually finishing to the exact lengths. With my improved saw I can shorten a beam one-eighth or one-fourth of an inch, can cut bevels true to line, finishing, if necessary, with a point one-sixteenth of an inch wide.

By using this hacked disk one saw-gang can do more cold-sawing in one day than two gangs with the disk having the smooth periphery.

What I claim, and desire to secure by Letters Patent, is—

5. A cold-saw consisting of a disk having irregular projections on its periphery irregularly arranged, substantially as described.

In testimony whereof I affix my signature in presence of two witnesses.

CHARLES S. SIMMERS.

Witnesses:
H. H. HIESTAND,
WILLIAM M. PHILLIS.